July 17, 1923.
P. E. SIEVERT
1,461,946
RACK FOR DRYING SEED CORN
Filed Oct. 12, 1922
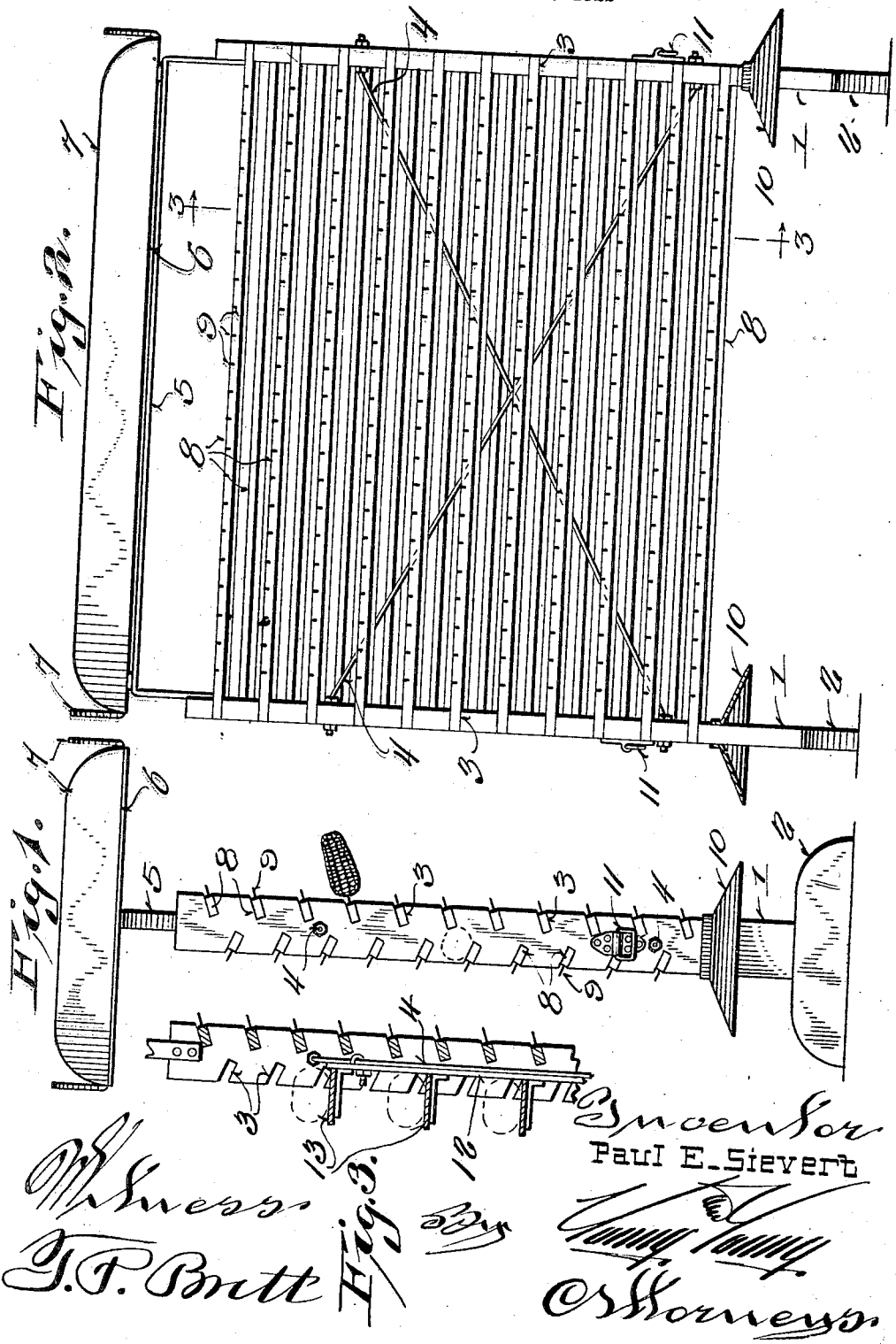
Inventor
Paul E. Sievert Patented July 17, 1923.

1,461,946

UNITED STATES PATENT OFFICE.

PAUL E. SIEVERT, OF WATERTOWN, WISCONSIN.

RACK FOR DRYING SEED CORN.

Application filed October 12, 1922. Serial No. 594,003.

*To all whom it may concern:*

Be it known that I, PAUL E. SIEVERT, a citizen of the United States, and resident of Watertown, in the county of Jefferson and State of Wisconsin, have invented certain new and useful Improvements in Racks for Drying Seed Corn; and I do hereby declare that the following is a full, clear, and exact description thereof.

This invention pertains to racks for drying seed corn and the like, and has primarily for its object to provide a simple, economical, and efficient rack adapted to receive ears of seed corn to most effectively dry the same.

A further object is to provide an arrangement whereby the rack may be converted to accommodate shelves for the reception of trays of seeds or various kinds of vegetables.

A more specific object is to provide a device of the above character with suitable guards adapted to prevent rodents from gaining access to the rack.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof, and in which:—

Figure 1 is an elevational end view of the invention.

Figure 2 is a front elevation, and

Figure 3 is a detail, fragmentary sectional view corresponding approximately to a section taken on the line 3—3 of Figure 2, showing the brackets in position.

Referring now more particularly to the accompanying drawings, the numeral 1 designates a pair of spaced uprights provided with supporting standards 2 and having their opposite edges provided with a plurality of inclined recesses 3, the recesses in one edge being staggered with relation to those of the opposite edge in order to prevent excessive weakening of the uprights.

The uprights 1 are connected and braced by a pair of diagonal stay rods 4 and their upper ends are connected by a strap 5 on which is mounted a cover 6, the cover being provided with upturned edges 7 which are cutaway at the corners to permit drainage and prevent the accumulation of water. While the cover 6 serves as a means for protecting the contents of the rack against rain, it is obvious that the same may be employed as a tray for the reception of various articles which it may be desired to dry or ripen in the sun.

Detachably mounted in the recesses 3 are a plurality of rack bars 8 provided with projecting pins 9 adapted to receive ears of corn in such manner as to expose all sides of the ears to the air, thus insuring an even drying of the kernels. Because of the incline of the recesses 3, it will be seen that the rack bars are likewise inclined, causing the pins 9 to tilt upwardly, thus preventing the ears from easily becoming detached or falling off the pins.

In practice, should the top side of the ear become more rapidly dried than the under side, the rack bar may be removed from the uprights and turned over to permit the sun to act on the under side.

In instances where it is desired to ripen vegetables, or dry trays of seeds, a number of the rack bars are removed from the recesses 3 and the brackets 12 bolted, or otherwise secured, to the diagonal stay rods 4, the brackets serving to support a plurality of shelves 13 for the reception of vegetables or trays.

In order to prevent rodents from gaining access to the rack and its contents, I provide the uprights 1 with metal guards 10 which surround the uprights and are positioned below the lowermost rack bar. The handles 11 secured to the uprights facilitate carrying the rack from one place to another.

I claim:—

1. A device of the character described comprising a pair of spaced uprights having their edges provided with recesses, braces connecting said uprights, a cover supported above the uprights, rack bars mounted in said recesses and provided with a plurality of pins projecting therefrom, and guards carried by said uprights to prevent access of rodents to the rack bars.

2. A device of the character described comprising a pair of spaced uprights having their edges provided with inclined recesses, brace members connecting said uprights, a cover supported above the uprights and provided with upturned edges cutaway at the corners to permit drainage of the cover, rack bars detachably mounted in said recesses and provided with pins projecting therefrom, and guards carried by said uprights and surrounding the same to prevent access of rodents to the rack bars.

In testimony that I claim the foregoing I have hereunto set my hand at Watertown, in the county of Jefferson and State of Wisconsin.

PAUL E. SIEVERT.